United States Patent

[11] 3,605,081

[72] Inventor Lawrence A. Tonies
Grayslake, Ill.
[21] Appl. No. 15,141
[22] Filed Feb. 27, 1970
[45] Patented Sept. 14, 1971
[73] Assignee Mangood Corporation
Grayslake, Ill.

[54] SEQUENCE DETECTOR FOR RAILWAY VEHICLE CONTROL SYSTEM
6 Claims, 2 Drawing Figs.

[52] U.S. Cl. .................................................. 340/23,
246/77, 177/163
[51] Int. Cl. ...................................................... G06f 7/02
[50] Field of Search ........................................... 177/134,
163, 210, 211, DIG. 8; 340/23, 31, 38; 246/169 D,
169 R, 77, 122, 247

Primary Examiner—Kathleen H. Claffy
Assistant Examiner—Thomas L. Kundert
Attorney—Davis, Lucas, Brewer & Brugman

ABSTRACT: An axle sequence detector for detecting a unique sequence of actuation of four railway track switches or actuators. Of all the possible sequence combinations, it responds to only one, actuating a sequence identification signal in response to that one sequence. It disregards all the other possible sequences. One application is given where axle detectors are arranged along the line of movement of a train, the sequence detector identifying a unique activation of the axle detectors in the order of "3rd + 4th + 1st + 2nd." Initially, the output lines of all switches or activators except the 3rd are blocked by control gate means. Actuation of the 3rd track switch unblocks a circuit containing the 4th track switch. Actuation of the latter unblocks the 1st track switch and renders the 3rd track switch circuit nonconductive. Actuation of the 1st track switch unblocks the 2nd track switch circuit and renders the 4th track switch circuit nonconductive. Actuation of the 2nd track switch triggers a sequence output signal and renders the 1st track switch nonconductive. Any other sequence commands circuit reset and start over.

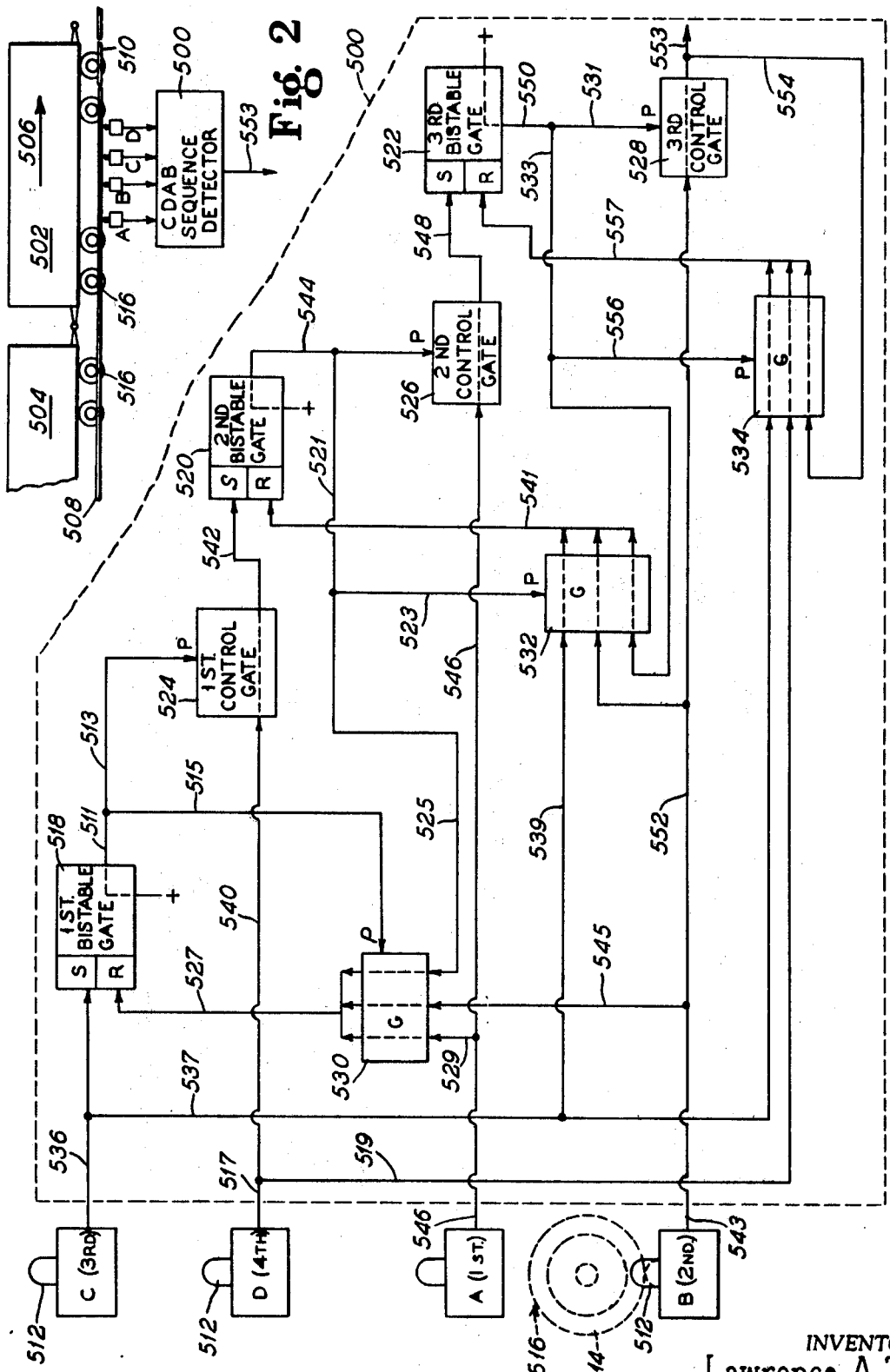

SEQUENCE DETECTOR FOR RAILWAY VEHICLE CONTROL SYSTEM

CROSS-REFERENCES TO RELATED APPLICATIONS

Reference is made to the following related patent applications, assigned to the same assignee, filed concurrently with this application:

Tonies application Ser. No. 15,066, filed Feb. 27, 1970, on "Method and Apparatus For Generating a Readout Signal Synchronized With Railway Vehicle Movement,"

Tonies application Ser. No. 15,066, filed Feb. 27, 1970, on "METHOD AND APPARATUS FOR GENERATING A READOUT SIGNAL SYNCHRONIZED WITH RAILWAY VEHICLE MOVEMENT";

Toneis and Teasdale application Ser. No. 15,067, filed Feb. 27, 1970, on "METHOD AND APPARATUS UTILIZING UNIQUE CDAB SEQUENCE FOR DETECTING SYNCHRONIZATION ERROR IN RAILWAY VEHICLE READOUT SIGNAL";

Tonies and Teasdale application Ser. No. 15,068, filed Feb. 27, 1970, on "METHOD AND APPARATUS UTILIZING UNIQUE CDAB SEQUENCE FOR CORRECTING SYNCHRONIZATION ERROR IN RAILWAY VEHICLE READOUT SIGNAL";

Tonies application Ser. No. 15,140, filed Feb. 27, 1970, on "METHOD AND APPARATUS FOR IDENTIFYING ENGINES IN A TRAIN OF RAILWAY VEHICLES";

Bailey application Ser. No. 15,142, filed Feb. 27, 1970, on "CIRCUIT FOR SIGNALING ALTERNATION ERROR IN DETECTORS FOR RAILWAY VEHICLE CONTROL SYSTEM."

BACKGROUND OF THE INVENTION

The field of the invention is generally that of actuating a readout signal which triggers the printing or display of weight, origin, destination, owner, type of load, and other information about individual railway vehicles which are coupled and in motion.

This invention is particularly applicable in single-draft or multidraft weighing of railway vehicles in which individual axle or truck assemblies, or an entire car or engine, are weighed and suitably totalized and printed out or displayed in response to a readout signal which coincides with weighing of the last axle or truck, or the entire vehicle. The railway vehicles may be coupled or uncoupled and in motion, or stationary on a weigh scale.

It is important that the readout signal be synchronized with the proper axle of each car. For example, in multidraft weighing, the signal must be synchronized with the last axle or truck of a car, otherwise it will add truck or axle weights from different cars and the total will be meaningless.

One way of maintaining a train of railway vehicles in synchronism with the readout signal is to provide four axle detectors arranged along the line of movement of the train, and then detect a unique "3rd +4th +1st +2nd" actuation sequence. Where the track switches or axle detectors are identified A, B, C, and D arranged in that order along the line of movement of the train, this is referred to as the unique "C-DAB" sequence. It may be used both to monitor synchronism and to resynchronize as described in copending applications Ser. No. 15,067 and Ser. No. 15,068 referred to above.

SUMMARY OF THE INVENTION

A principal object of the present invention is to provide a sequence detector for a series of railway track switches which can detect one specific sequence of operation, rejecting all others.

A specific object of the present invention is to provide a sequence detector for a series of railway track switches or axle detectors identified A, B, C and D and arranged in that order along the line of movement of a train of railway vehicles and effective to activate a signal in response to actuation of the track switches in the order C+D+A+B, and only in that order.

Other objects and advantages will be apparent from the following description taken in connection with the drawings in which:

FIG. 1 is a circuit showing a preferred form of the invention; and

FIG. 2 illustrates how the circuit may be applied to detecting the unique CDAB sequence in motion weighing of railway vehicles, and the like. The circuit generally designated 500 in FIG. 1 is shown as a block in FIG. 2.

Portions of two railway cars, 502, and 504, which are coupled, are shown moving to the right in the direction of the arrow 506 on rails 508. Where the system is employed to weigh individual cars while coupled and in motion, a short weigh rail 510 may be placed in the track 508. Axle detectors (track switches) A, B, C and D are shown arranged in that order along the line of movement of the train.

Each axle detector may be any suitable means for detecting the arrival, presence or passage of an axle assembly and may be responsive to magnetic, inductive, capacitive, electrical or mechanical characteristics of an axle or wheel. In the present case, each detector is in a nature of a track switch which is provided with a plunger 512 positioned to be deflected downward by the flange 514 of each axle assembly 516.

The detailed construction and operation will now be described.

Important elements of the circuit include 1sr, 2nd and 3rd bistable gates 518, 520 and 522 respectively; 1st, 2nd and 3rd control gates 524, 526 and 528 respectively; and multiple-pass control gates 530, 532 and 534 respectively.

When the 3rd axle detector C is actuated it places a signal in line 536, 537 and 539. Gates 532 and 534 are blocked at this time so the signals cannot get through. The signal in 536 sets the 1st st bistable gate 518 placing an output signal in line 511 and branch lines 513 and 515. The signals in the latter two lines render gates 524 and 530 permissive.

At this step, axle detector D is placed in communication with the 2nd bistable gate 520 as the result of unblocking gate 524 with the signal in line 513.

Thus, if the next actuation is that of axle detector D an output signal will appear in line 517 and branch lines 540 and 519. The latter is blocked at gate 534. The signal through line 540, gate 524, and line 542 sets the 2nd bistable gate 520 and the resulting output signal in line 544 renders the 2nd control gate 526 permissive thereby providing communication between the 1st axle detector A and the 3rd bistable gate 522. The signal in line 544 also branches into line 521 where it renders gate 532 permissive through line 523 and it passes through line 525 and gate 530 (held permissive by the signal in line 515) and through line 527 to reset the 1st bistable gate 518.

This extinguishes the output signal in lines 513 and 515 restoring both gates 524 and 530 to their normal blocked states.

Next, actuation of the 1st axle detector A places a signal in output line 546 and branch line 529. The latter is ineffective because gate 530 is blocked. The signal in line 546 and 548, via gate 526, sets the 3rd bistable gate 522 placing an output signal in line 550 and branch lines 531, 533 and 556. The signal in line 531 renders the 3rd control gate 528 permissive. The signal in line 556 renders gate 534 permissive. The signal line 533 passes through gate 532 (held permissive by the signal in line 523) through line 541 and resets the 2nd bistable gate 520 thereby extinguishing the signal in output line 544 and restoring gates 526 and 532 to their normal blocked states.

If the 3rd, 4the, and 1st, axle detectors C, D, and A respectively have been actuated in that sequence with no intervening actuations, the circuit is ready to activate a CDAB sequence signal. This occurs, next, upon actuation of the 2nd axle detector B. This places an output signal in line 543 and branch lines 545 and 552. The signal in line 545 will be ineffective because gate 530 is blocked. The signal in line 552 will pass through the 3rd control gate 528 into lines 553 and 554. 553 is the line carrying the CDAB sequence signal indicating that such sequence has just completed. The signal in line 554 passes through gate 534 because of the permissive signal in line 556 and passes through line 557 to reset the 3rd bistable gate 522, thereby extinguishing the output signal in line 550, restoring gates 528 and 534 to their normal blocked states.

The circuit 500 is now fully restored, with bistable gates 518, 520, and 522 in their reset conditions and with control gates 524, 526 and 528 in their blocked states, and with multipass gates 530, 532 and 534 in their blocked states, ready to accept a new CDAB sequence.

If, after the axle detector C is actuated, either A or B is actuated instead of D, the circuit will reset and have to start over again with the next actuation of the axle detector C.

Likewise, if, after a CD sequence, detector B or C is actuated before A, the system will reset and have to start over again. For example, if the axle detector C sets the bistable gate 518 and places an output signal in line 515 to unblock gate 530, a signal from either A or B through gate 530 would reset the gate 518, extinguishing the signal in output line 513. This, of course, would restore gate 524 to its normal blocked condition and a subsequent actuation of detector D would be ineffective to continue the sequence review.

After a CDA sequence, if detector C or D is actuated before detector B, a signal through (permissive) gate 534 will reset the 3rd bistable gate 522 requiring the circuit to start over again.

If the circuit repeats any actuation and generates an AA, BB, CC, or DD, this can generate an error signal by a suitable circuit such as that shown and described in Bailey application Ser. No. 15,142 referred to above.

I claim as my invention:

1. A sequence detector for a series of four axle detectors arranged in 1st, 2nd, 3rd and 4the locations along the line of movement of a train and being effective to identify a unique sequence of actuation of said axle detectors in the sequence "3rd +4th+1st +2nd " comprising: a circuit for each axle detector;

each circuit except the 3rd axle detector circuit being nonconductive in initial state;

means responsive to actuation of the 3rd axle detector to render the 4th axle detector circuit conductive;

means responsive to actuation of the 4th axle detector to render the 1st axle detector circuit conductive and the 3rd axle detector circuit nonconductive;

means responsive to actuation of the 1st axle detector to render the 2nd axle detector circuit conductive and the 4th axle detector circuit nonconductive; and means responsive to actuation of the 2nd axle detector to activate a sequence signal and to render the 1st axle detector circuit nonconductive, thereby returning the 1st, 2nd and 4th axle detector circuits to said initial state.

2. A sequence detector according to claim 1 including means for rendering the 1st axle detector circuit nonconductive in response to said sequence signal.

3. A sequence detector for a series of four axle detectors arranged in 1st, 2nd, 3rd and 4th locations along the line of movement of a train and being effective to identify a unique sequence of actuation of said axle detectors in the sequence "3rd '4th +1st +2nd " comprising: a circuit for each axle detector;

1st, 2nd and 3rd control gates initially blocking output from said 4th, 1st, and 2nd axle detectors respectively;

means responsive to actuation of the 3rd axle detector to unblock said 1st control gate to render the 4th axle detector circuit conductive, means responsive to actuation of the 4th angle detector to unblock said 2nd control gate to render the 1st axle detector circuit conductive and the 3rd axle detector circuit nonconductive;

means responsive to actuation of the 1st axle detector to unblock said 3rd control gate to render the 2nd axle detector circuit conductive and the 4the axle detector circuit nonconductive; and means responsive to actuation of the 2nd axle detector to actuate a sequence signal and to render the 1st axle detector circuit nonconductive, restoring the circuits for a repeated response to said "3rd +4th +1st +2nd" sequence.

4. A sequence detector according to claim 3 including means for rendering the 1st detector circuit nonconductive in response to said sequence signal.

5. A sequence detector for a series of four axle detectors arranged in 1st, 2nd, 3rd and 4th locations along the line line of movement of a train and being effective to identify a unique sequence of actuation of said axle detectors in the sequence "3rd +4th +1st +2nd" comprising: a circuit for each axle detector;

1st 2nd 3rd bistable gates settable in response to actuation of said 3rd, 4th and 1st axle detectors respectively;

a 1st control gate initially blocking output from the 4th axle detector to the 2nd bistable gate;

a 2nd control gate initially blocking output from the 1st axle detector to the 3rd bistable gate;

a 3rd control gate initially blocking output from the 2nd axle detector to a sequence signal output line;

means responsive to actuation of the 3rd axle detector to set the 1st bistable gate and unblock the 1st control gate and render the 4th axle detector circuit conductive;

means responsive to actuation of the 4th axle detector to set the 2nd bistable gate to unblock the 2nd control gate to render the 1 st axle detector circuit conductive and to reset the 1st bistable gate to render the 3rd axle detector circuit nonconductive;

means responsive to actuation of the 1st axle detector to set the 3rd bistable gate to unblock the 3rd control gate to render the 2nd angle detector circuit conductive and to reset the 2nd bistable gate to render the 1st axle detector circuit nonconductive; and means responsive to actuation of the 2 nd axle detector to activate a sequence signal on the output side of the 3rd control gate and to reset the 3rd bistable gate.

6. A sequence detector according to claim 5 having means effective to restore all bistable gates to reset state in response to any sequence of actuations following the 3rd axle detector actuation other than the sequence "4th +1st +2nd" detector actuations.

PO-1050
(5/69)

UNITED STATES PATENT OFFICE
CERTIFICATE OF CORRECTION

Patent No. 3,605,081        Dated Sept. 14, 1971

Inventor(s) Lawrence A. Tonies

It is certified that error appears in the above-identified patent and that said Letters Patent are hereby corrected as shown below:

Col. 1, lines 8-10, should be cancelled; line 15, "Toneis" should read --Tonies--. Col. 2, line 27, "1sr" should read --1st--; line 34, "1st st bistable" should read --1st bistable-- line 68, "4the" should read --4th--. Col. 3, line 35, "4the" should read --4th--. Col. 4, line 2, "3rd ' 4th + 1st + 2nd" should read --3rd + 4th + 1st + 2nd--; line 8, the comma should be a semi-colon; line 9, "angle" should read --axle--; line 14, "4the" should read --4th--; line 22, "1st detector" should read --1st axle detector--; line 25, "line line" should read --line-- line 48, "angle" should read --axle--.

Signed and sealed this 21st day of March 1972.

(SEAL)
Attest:

EDWARD M. FLETCHER, JR.
Attesting Officer

ROBERT GOTTSCHALK
Commissioner of Patents